United States Patent

[11] 3,631,849

[72] Inventor Elwood G. Norris
Seattle, Wash.
[21] Appl. No. 882,518
[22] Filed Dec. 5, 1969
[45] Patented Jan. 4, 1972
[73] Assignee Medical Development Corporation
Salt Lake City, Utah

[54] PHASE-LOCK DOPPLER SYSTEM FOR MONITORING BLOOD VESSEL MOVEMENT
5 Claims, 1 Drawing Fig.

[52] U.S. Cl. ................................................ 128/2.05 R,
73/67.7, 128/2.05 P, 128/24 A
[51] Int. Cl. ................................................ A61b 5/02
[50] Field of Search ...................................... 128/2.05 R,
2.05 V, 2.05 N, 2.05 F, 2, 24 A; 73/67.7–67.9

[56] References Cited
UNITED STATES PATENTS
2,268,643  1/1942  Crosby ...................... 73/67.7 UX
2,908,888  10/1959 Kirkland ..................... 73/194 A
3,334,622  8/1967  Brech ........................ 128/2
3,321,959  5/1967  Wood et al. ................. 73/67.7
3,280,622  10/1966 Carlin ....................... 73/67.9
FOREIGN PATENTS
683,592  12/1952  Great Britain .............. 73/67.7

OTHER REFERENCES
Sonomedic Corp. Catalogue, Received May, 1964, 5 pages
Ultrasonics, Apr. 1969, pp. 127 & 128
Journ. of Acoustical Soc. of Amer., Apr. 1967, pp. 1,052–1,057

*Primary Examiner*—Richard A. Gaudet
*Assistant Examiner*—Kyle L. Howell
*Attorney*—M. Ralph Shaffer ABSTRACT: An apparatus for monitoring movement of a blood vessel in an animal body. A pair of transducers are disposed adjacent the skin of an animal body in the general region of the blood vessel. One of the transducers has the output of a voltage-controlled oscillator connected thereto and directs an ultrasonic signal at the vessel. Because of Doppler effect, the portions of this ultrasonic signal which are reflected to the other transducer have a different frequency, and thus phase, than the transmitted signal. The magnitude and sign of this phase difference is detected by feeding both the received signal and the transmitted signal to a balanced mixer. The output signal from the balanced mixer is supplied to a monitor and display device and additionally through a delay circuit to the voltage-controlled oscillator to adjust its frequency so that the phase thereof is always locked to further movements of the blood vessel.

INVENTOR.
ELWOOD G. NORRIS
BY Christensen, Sanborn
& Matthews
ATTORNEYS

3,631,849

PHASE-LOCK DOPPLER SYSTEM FOR MONITORING BLOOD VESSEL MOVEMENT

BACKGROUND OF THE INVENTION

This relates to an apparatus useful in medical instrumentation and, more particularly, to a system for monitoring the relative movements of a blood vessel in an animal body.

In the general field of medical practice, it is desirable to know the occurrence of, the extent of, and direction of movement of a person's blood vessels, such as his arteries and veins, to aid in medical diagnosis, prognosis, and resultant treatment. For example, the periodic pulsation of a blood vessel by passage of blood therethrough provides a direct indication of a person's heartbeat rate and acceleration. Also, the long term variations in vessel size furnish one indicator of changes in blood pressure. In another situation, the relative magnitude of the periodic pulsations of a person's vessels with respect to those of a healthy specimen may be used to detect the onset or occurrence of arteriosclerosis. Many more uses for the parameter of blood vessel movement will be recognized by those skilled in the medical arts.

Since blood vessel movement is indeed an important indicator of practical use to the physician, it is important that he have a reliable apparatus which provides a stable output signal indicating such movement. For obvious reasons of patient comfort, it is additionally desirable that this apparatus be used externally of the body. It is to such an apparatus that this invention is directed.

SUMMARY OF THE INVENTION

An apparatus for monitoring blood vessel movement is constructed according to the teachings of this invention by including a phase-lock Doppler system detecting the apparent change in phase of a first signal that results from blood vessel movement, the signal being produced by a voltage-controlled oscillator whose ultrasonic frequency is controlled by a second signal supplied through a feedback loop from a means detecting said phase difference.

BRIEF DESCRIPTION OF THE DRAWING

For a complete understanding of the teachings of this invention, together with objects or advantages thereof, reference should be made to the following specification taken in conjunction with the accompanying drawing which illustrates a block diagram of the phase-lock Doppler system of this invention.

DESCRIPTION OF A PREFERRED EMBODIMENT

Figure 1:
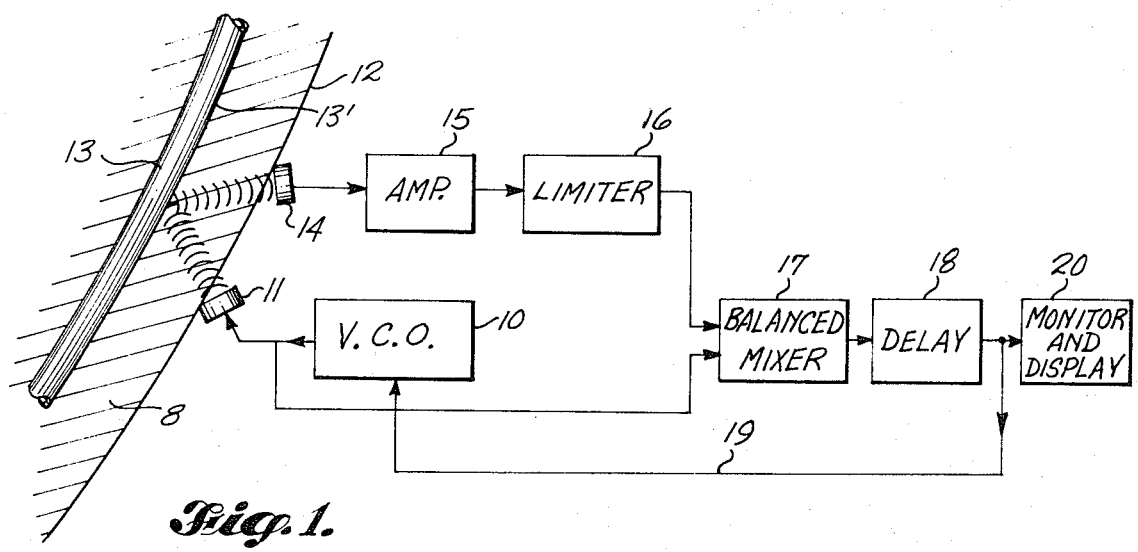

With particular reference to the drawing, the animal body includes a skin surface 12, a flesh portion 8, and a blood vessel 13. It is desired that the relative movements of blood vessel 13 be monitored. Blood vessel 13 may be an artery or a vein, and in either case includes an outer wall 13' which expands and contracts in response to the periodic pulsations of blood therein.

The apparatus of this invention is disposed externally of the skin 12, and includes a voltage-controlled oscillator 10 whose frequency may be chosen to be in the range of 1–5 MHz. The exact frequency used is not material, it only being necessary to have a signal in the ultrasonic range whose wavelength allows high-resolution detection of minute blood vessel movements. The output of voltage-controlled oscillator is connected to a transmitting transducer 11 which is in contact with the skin 12. Transducer 11 may comprise any piezoelectric crystal operative in the desired range of frequencies and should be coupled to the skin surface by means of a gel, known in the industry under the trademark "Aquasonic," or other suitable means maintaining the surface of transducer 11 in contact with skin 12.

The resultant ultrasonic waves from transducer 11 are transmitted through the flesh portion 8 to blood vessel 13 and impinge on the wall surface 13' thereof. The angle of incidence of the impinging waves preferably should be chosen to be greater than the critical angle of the flesh-blood vessel interface, so that total reflection of the transmitted wave occurs. However, in any case a portion of the transmitted wave will be reflected by wall 13'. The reflected wave travels through flesh portion 8 back to the skin 12. A pickup transducer 14 is disposed in contact with skin 12 and is coupled thereto by a gel, known in the industry under the trademark "Aquasonic," in a manner similar to transducer 11. Transducer 14 also may comprise a piezoelectric crystal and should be placed so that the strongest possible output signal is obtained therefrom. The electric output signal produced in transducer 14 from the reflected wave is coupled to the input of an amplifier 15. The output signal of amplifier 15 is passed through a limiter 16 so that the magnitude thereof is limited to the approximate value of the output signal from voltage-controlled oscillator 10.

The signals from limiter 16 and voltage-controlled oscillator 10 are coupled to two inputs of a balanced mixer circuit 17 whose function is to provide an output signal whose magnitude and sign are proportional to the phase relationship of the two input signals thereto. This output signal is coupled through a delay circuit 18 to a monitor and display device 20, and additionally via a lead 19 to the control input of voltage-controlled oscillator 10.

The function and operation of the monitoring apparatus will now be described in more detail. The detection of blood vessel movement is predicated on the use of the well-known Doppler phenomenon by which the apparent frequency of a wave reflected from an object shifts with respect to the frequency of the wave source, as the object moves relative to a monitoring point. There are two sets of occurrences of that phenomenon in any detection of blood vessel movement according to this invention. First, considering transducer 11 as the source of a wave having a given frequency $f_o$, and the wall 13' of the blood vessel 13 as the monitoring point, if blood vessel 13 is moving away from transducer 11, the apparent frequency at 13' is higher than $f_o$. Conversely, if the blood vessel 13 is moving toward transducer 11, the apparent frequency at 13' is higher than $f_o$. Likewise, if 13' is considered as the source of the reflected wave, and transducer 14 as the monitoring point, if the vessel 13 is moving away from transducer 14, the apparent frequency at 14 is lower than that at 13', and conversely, if vessel 13 is moving toward transducer 14, the apparent frequency at 14 is higher than that at 13'.

The frequency, and thus phase, difference between the signal transmitted by transducer 11 and that received by transducer 14 is accordingly a sum of these two sets of Doppler phenomenon. In general, it may be said that when blood vessel 13 is contracting, and thus wall 13' is moving away from skin surface 12, the apparent frequency at transducer 14 is lower than the frequency supplied by transducer 11. Conversely, when the blood vessel 13 is expanding, and wall 13' is moving toward the skin surface 12, the apparent frequency at transducer 14 is higher than that supplied by transducer 11.

The magnitude and sign of this difference can then be monitored to provide an indication of blood vessel movement. The balanced mixer 17 provides this function and essentially comprises a phase comparison device whose output signal is proportional to the phase difference of the two input signals thereto. The output signal is coupled through delay device 18 to monitor and display device 20 which may comprise a simple voltmeter, a recording voltmeter, an oscilloscope, a neon lamp, or other device capable of providing electrical and visual indication of blood vessel movement.

In the course of this movement, the detected frequency at transducer 14 differs from the frequency $f_o$ voltage-controlled oscillator 10 by an amount proportional to the amount of blood vessel movement, as previously described. To maintain the voltage-controlled oscillator 10 in relative step with this change in frequency, however, a phase-lock circuit including delay circuit 18 and lead 19 between the output of balanced mixer 17 and the input of voltage-controlled oscillator 10 is utilized. Briefly, the signal from balanced mixer 17 may be considered as a frequency adjustment or error signal which is supplied to voltage-controlled oscillator 10 to reduce the magnitude of the output signal from balanced mixer 17. In operation, this signal changes the frequency of voltage-controlled oscillator 10 to a value approximating that of the apparent frequency at transducer 14. However, due to the delay in circuit 18, the voltage-controlled oscillator 10 never quite accomplishes an in-phase condition with the apparent frequency of the reflected wave. To give an example, when blood vessel 13 is contracting, and the signal at the input of voltage-controlled oscillator 10 provides an output frequency $f_o$ therefrom, the apparent frequency in transducer 14 is $f_o-\Delta f$, where $\Delta f$ is the Doppler shift. The output signal from balanced mixer 17 then has a magnitude and sign proportional to $-\Delta f$ and, if supplied to the input of the voltage-controlled oscillator 10, would reduce its frequency by $\Delta f$. Because of delay circuit 18, this frequency correction is not instantaneous. Furthermore, by the time the frequency of voltage-controlled oscillator 10 has been reduced to $f_o-\Delta f$, blood vessel 13 has either changed its rate of contraction, has ceased to contract altogether, or has begun to expand. Thus, the apparent frequency of the reflected wave at transducer 14 will have yet another value, dependent upon the rate and type of blood vessel movement, and thus the two signals supplied to balanced mixer circuit 17 remain out of step. By such an arrangement, the movements of blood vessel 13 can be constantly and continuously monitored.

Certain modifications to the apparatus illustrated in FIG. 1 can readily be visualized. For example, delay circuit 18 may be placed in lead 19 and the output of balanced mixer 17 supplied directly to monitor and display device 20. The arrangement of FIG. 1 is advantageous over such a connection only in filtering noise signals present in the output of balanced mixer 17. The apparatus may also be applied to detection of the movements of a flexible tube or other conduit having a liquid or gas flowing therein.

What I claim is:

1. An apparatus for monitoring the movement of a blood vessel in an external animal body comprising
    a. an oscillator means having a control terminal and an output terminal and producing a first signal at said output terminal whose frequency is determined by the magnitude and sign of a signal supplied to said input terminal,
    b. a transmitting transducer coupled to said output terminal and responsive to said first signal coupled thereto, to produce an ultrasonic wave, said transmitting transducer being constructed and being positionable to direct said ultrasonic wave at said blood vessel,
    c. pickup transducer means for detecting the portion of said ultrasonic wave reflected at an apparent frequency from the blood vessel and for producing a second signal in the response thereto,
    d. comprising means coupled to said oscillator means and to said pickup transducer means and responsive to said first and second signals to produce a frequency adjustment output signal whose sign and magnitude are proportional to the relative phase displacement thereof,
    e. delay means coupling said comparing means to said control terminal of said oscillator means, whereby to feed back said frequency adjustment signal to said control terminal of said oscillator means and thereby correct the frequency of said first signal to a new frequency approximating the apparent frequency of said ultrasonic wave as received by said pickup transducer means, and
    f. a monitor and display device coupled to said delay means, thereby having said frequency adjustment signal coupled thereto, to provide a visual indication of blood vessel movement.

2. The apparatus as recited in claim 1, further comprising an amplifying and limiting means interposed between said pickup transducer and said comparing means to maintain the magnitude of said second signal at a value approximating that of said first signal.

3. The apparatus as recited in claim 1 wherein said oscillator means comprises a voltage controlled oscillator having a nominal frequency in the range of 1-5 MHz. and said transmitting and pickup transducers each comprise a piezoelectric crystal operative to transmit and receive ultrasonic waves in said frequency range.

4. A method for detecting relative movements of a flexible conduit having a fluid flowing therethrough, comprising the steps of:
    a. directing an ultrasonic wave having a first frequency at the flexible conduit,
    b. detecting the portion of said ultrasonic wave reflected from the conduit,
    c. observing the apparent shift in frequency of said reflected portion of said ultrasonic wave with respect to that of said directed ultrasonic wave, and
    d. changing the frequency of said directed ultrasonic wave after a predetermined time delay from said first frequency to the apparent frequency of said reflected portion.

5. An instrument for continuously detecting movements of a blood vessel in an exterior animal body, comprising:
    a. means constructed to transmit an ultrasonic wave having a stable frequency at said blood vessel so that a portion thereof is reflected from the vessel,
    b. means coupled to said constructed means for detecting any Doppler shift which occurs in said reflected portion as a result of movement of the blood vessel,
    c. means coupled to said detecting means for adjusting the stable frequency of said transmitting means after a predetermined time delay by an amount equal to said Doppler shift, and
    d. means coupled to said detecting means for converting said Doppler shift into a visual indication of blood vessel movement.

* * * * *